UNITED STATES PATENT OFFICE.

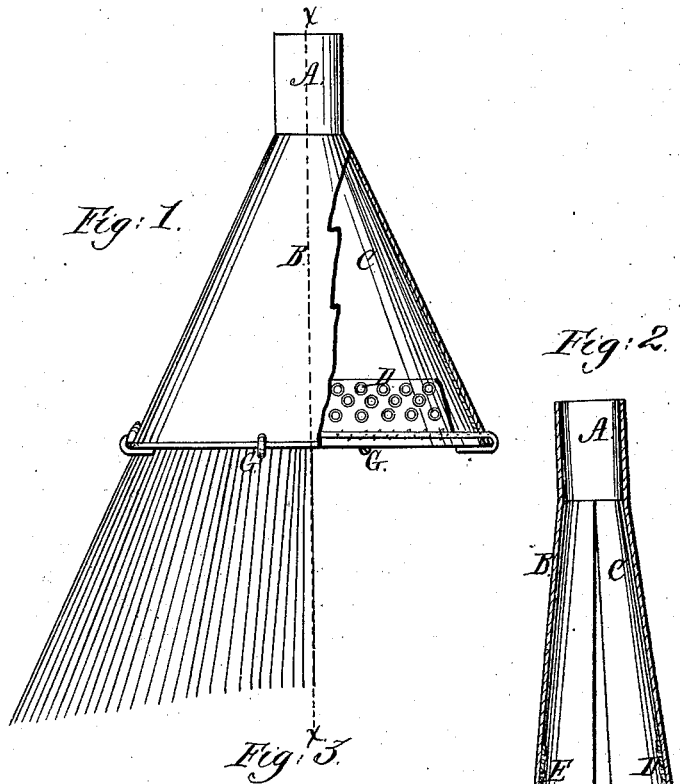

JAMES WASSON, OF FAIRWATER, WISCONSIN.

IMPROVED BROOM-HEAD.

Specification forming part of Letters Patent No. 55,936, dated June 26, 1866.

*To all whom it may concern:*

Be it known that I, JAMES WASSON, of Fairwater, of Fond du Lac county, State of Wisconsin, have invented a new and useful Improvement in Broom-Heads; and I do hereby declare that the following is a full, clear, and exact description thereof, which will enable others skilled in the art to make and use the same, reference being had to the accompanying drawings, forming part of this specification, in which—

Figure 1 is a side view of my improved broom-head, a part being broken away to show the construction. Fig. 2 is a longitudinal section of the same, taken through the line $x$ $x$, Fig. 1. Fig. 3 is a bottom view of the same.

Similar letters of reference indicate like parts.

My invention has for its object to furnish an improved broom-head, simple in construction, neat in appearance, and which can be easily filled with corn when and as often as desired; and it consists, first, in the combination, with each other and with the socket, of the two parts or halves of the broom-head, constructed as hereinafter described; second, in the combination, with the halves of the broom-head, of two perforated plates for holding the corn in place; and, third, in the combination, with the parts or halves of the broom-head, of barbed or roughened spikes or hooks for securing the said parts or halves to each other and to the corn.

A is the socket, which is made in the form of a band, and by means of which the broom-head is attached to the handle in the ordinary manner. B and C are the parts or halves, which are cut out into the form shown in the drawings. The upper edges of these parts are then soldered fast to the lower edge of the socket A, but the side edges of said parts are left separate from each other, as shown in Fig. 2. D and E are two plates securely attached to the inner surfaces of the plates or halves B and C, just above their lower edges, as shown in Figs. 1 and 2. These plates D and E are punched full of holes from their under sides, so as to roughen them or give them a grater-like surface, to take hold of the corn when the said parts are pressed together, and hold it securely in place. F are spikes or hooks, the bodies of which are barbed or roughened so as to pierce the corn and hold it in place, and at the same time not be liable to work themselves out while the broom is being used. The outer ends of these spikes are bent over into hooks, as shown in Fig. 1. These spikes are passed into the broom-head through holes formed in the overlapping side edges of the parts or halves B and C, and thus hold the said parts together at the same time they assist in holding the corn in place. The lower edges of the parts B and C are kept from bulging at the center by hooks G, having hooks at each end, which hook over the lower edges of the parts B and C, as shown in Figs. 1 and 3. These hooks G at the same time assist in keeping the corn in place and the inner ends of the spikes F from working downward.

I claim as new and desire to secure by Letters Patent—

1. An improved broom-head formed by combining with each other and with the socket A the two parts or halves B and C, constructed substantially as herein described, and for the purpose set forth, said halves being held together at the lower part of their side edges by the barbed spike-hooks F.

2. The combination of the two perforated or roughened plates D and E, constructed, as described, with the parts or halves B and C, substantially as and for the purpose set forth.

3. The combination of the barbed spikes F with the halves or parts B and C, substantially as described, and for the purpose set forth.

JAMES WASSON.

Witnesses:
THOMAS HARRIS,
JACOB CARTER.